United States Patent

[11] 3,600,619

[72] Inventor Roger C. Tiarks
  West Allis, Wis.
[21] Appl. No. 43,664
[22] Filed June 5, 1970
[45] Patented Aug. 17, 1971
[73] Assignee Lincoln Tool & Manufacturing Co.
  Milwaukee, Wis.

[54] STATOR WINDING
  15 Claims, 3 Drawing Figs.
[52] U.S. Cl. .................................................. 310/180,
  310/206
[51] Int. Cl. ............................................... H02k 3/00
[50] Field of Search ..................................... 310/180,
  189, 184, 198, 203, 200, 204, 202, 205, 206, 207;
  29/596, 605; 242/1.1

[56] References Cited
  UNITED STATES PATENTS
2,180,327  11/1939  Wilber ............................. 310/203
2,610,312  9/1952   Seay ............................... 310/184
2,989,654  6/1961   Neyhouse ........................ 310/203
2,995,672  8/1961   Johnson ........................... 310/180
3,321,653  5/1967   Sonoyama ........................ 310/180
3,497,730  2/1970   Doolittle ......................... 310/180
3,535,573  10/1970  Appleton ......................... 310/207

Primary Examiner—Milton O. Hirshfield
Assistant Examiner—R. Skudy
Attorneys—Wheeler, House and Wheeler and Robert E. Clemency

ABSTRACT: A stator winding includes three simultaneously wound winding patterns which are angularly spaced at 40°. Each winding pattern includes a series of 12 alternately oppositely wound coils in lapping relation to coils in the other two patterns, which coils all have a uniform span of 30°.

Also disclosed herein is a method of producing the first mentioned stator winding.

PATENTED AUG 17 1971

3,600,619

Inventors
Roger C. Tiarks
By
Wheeler, Wheeler, House & Clemency
Attorneys

STATOR WINDING

BACKGROUND OF THE INVENTION

The invention relates to stator windings and particularly to windings for a multislot stator such as a 36 slot stator. However, the invention, at least in part, is applicable to stators having other than 36 slots. Examples of prior stator windings are found in U.S. Pat. Nos. 3,396,290; No. 3,413,717, and No. 3,432,707. The foregoing patents disclose simultaneous windings of several coils in series so that subsequent coils are alternately wound with the same wire in opposite rotative directions and so that successive coils share a common slot (See especially U.S. Pat. No. 3,396,290).

The invention further relates to winding methods and to multi-needle winding heads of the type generally disclosed in U.S. Pat. Nos. 3,334,825; No. 3,323,734, and in application Ser. No. 676,610.

SUMMARY OF THE INVENTION

The invention provides a stator winding in which several winding patterns of series connected, alternately oppositely wound coils are simultaneously laid in overlapping relation to each other and with the first winding pattern or series of coils preceding the second winding pattern or series of coils at an angular interval equal to the angular interval by which the second winding pattern or series of coils precedes the third winding pattern or series of coils. In the disclosed winding in accordance with the invention, three winding patterns or series of coils are employed with the series being mutually spaced from one another at angular intervals of 40°. The disclosed winding advantageously generates a wave form which closely approaches a theoretical sinusoidal curve or wave. In addition, the winding has a low height axially of the stator thus reducing space requirements and also requiring less copper. Still further, windings in accordance with the invention can be obtained by using known winding machinery for reciprocating and oscillating a winding head.

The invention also provides a novel method of winding a stator in which several coil patterns are simultaneously wound and are angularly related to one another in such manner that the coils first wound in each pattern are in angularly adjacent relation to each other and that the second coils wound in each pattern are in angularly adjacent relation to each other with the second coils wound in each pattern being in overlapping relation to the first coils wound in each pattern. Such relationships are continued until the winding is completed.

The invention also provides a winding head which is adapted to perform the method mentioned above to achieve the winding mentioned above. In this regard, the invention provides a multineedle winding head in which all of the needles are angularly spaced in a series with a common angular interval therebetween and within less than about 180° of the circular periphery of the head. In the disclosed head in accordance with the invention, three needles are arranged in a circular series at 40° intervals.

One of the principal objects of the invention is the provision of a new and improved stator winding which provides excellent generating characteristics and, at the same time, occupies a minimum of space and utilizes a minimum of copper.

Another of the principal objects of the invention is the provision of a new and improved stator winding which utilizes all of the stator slots and in which each slot receives one leg of each of two coils.

Another principal object of the invention is the provision of a stator winding including three identical winding patterns of twelve series connected, successively oppositely wound coils, which patterns are wound at an angular distance of 40° from one another.

Another of the principal objects of the invention is the provision of a method of winding a stator in which a series of generally identical winding patterns or series of coils are simultaneously wound upon the stator, which winding patterns are angularly spaced at even distances within a range of less than 180°. In the disclosed method in accordance with the invention, three winding patterns are employed, which winding patterns are located, in series, at 40° intervals from one another.

Another of the principal objects of the invention is the provision of a winding head adapted to perform the disclosed method to obtain the disclosed winding.

Still another object of the invention is the provision of a multineedle winding head in which the needles are located in series within less than about one-half of the circular periphery of the head and which needles are equiangularly spaced from one another within the series.

Still another object of the invention is the provision of a winding head having three needles which are spaced from one another in angular series by intervals of 40°.

Other objects and advantages of the invention will become known by reference to the following description and accompanying drawings. cDRAWINGS FIG. 1 is an exploded schematic diagram illustrating a winding embodying various of the features of the invention.

DESCRIPTION OF THE INVENTION

Figure 3:
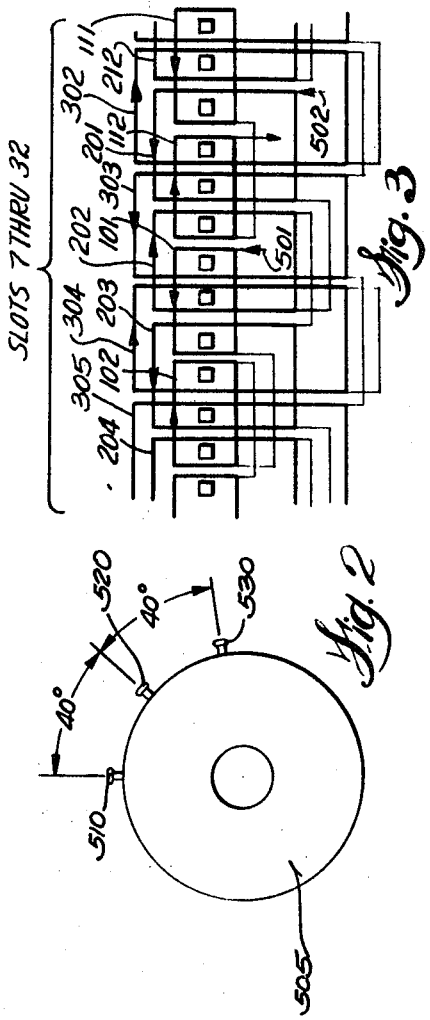
FIG. 3 is a fragmentary schematic diagram which further illustrates the winding which is shown in FIG. 1.
Figure 1:
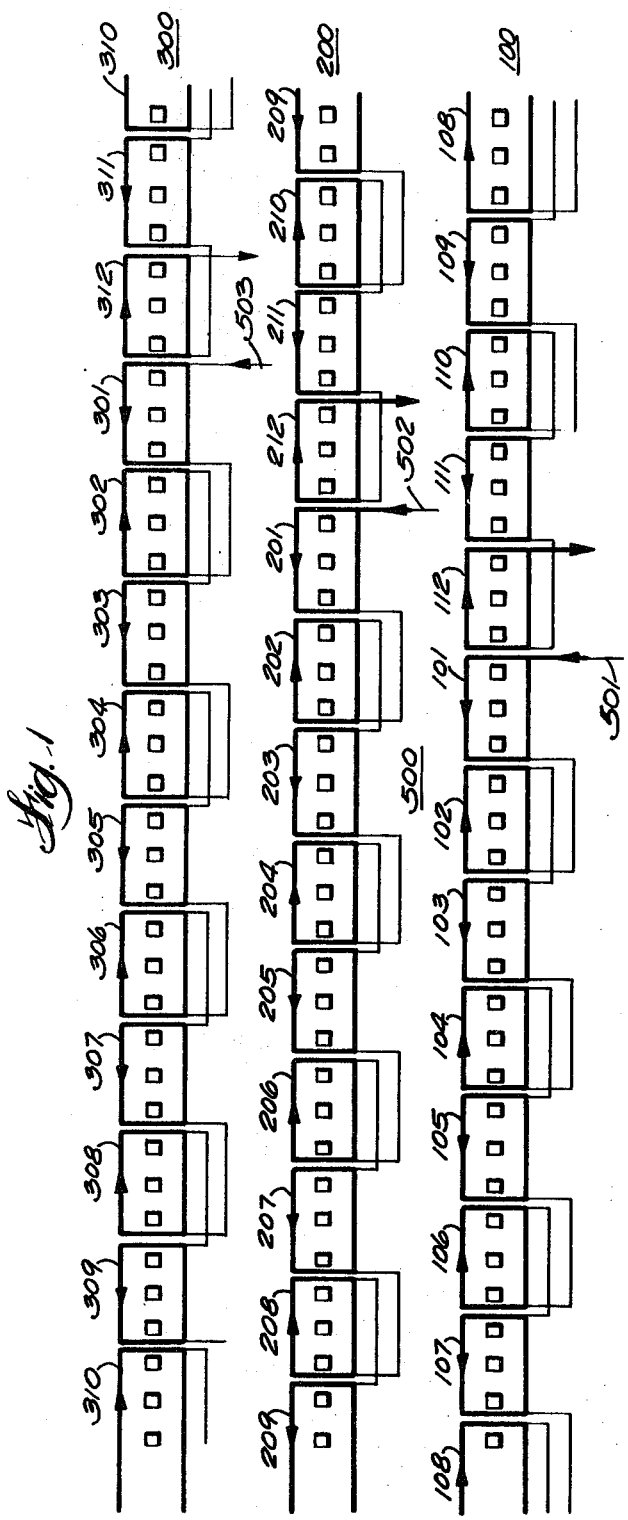

The winding 500 shown in FIG. 1 is located with reference to a 36-slot stator as shown, for instance, in U.S. Pat. No. 3,396,290. In FIG. 3 of the drawings, a fragment of the overall winding is illustrated showing particularly the lapping relation of the various coils. In FIG. 1 of some of the drawings, the slots are presented in four identical arrays, one above the other, the lowest array being employed to number the slots from 1 to 36 and each of the other slot arrays being employed to illustrate first, second, and third winding patterns 100, 200, and 300 respectively, which winding patterns are simultaneously formed from separate continuous lengths of wire 501, 502, and 503. Each of the slots 1 through 36 is spaced from the adjacent slots by 10°.

Figure 2:
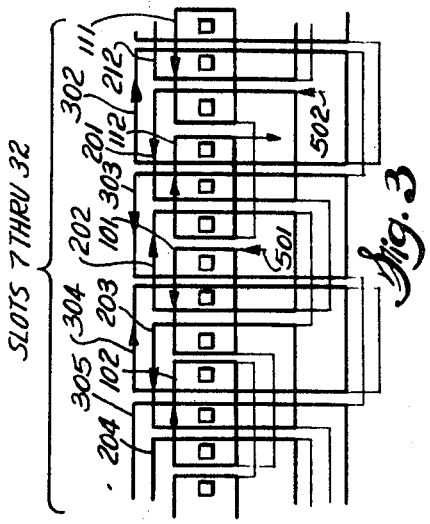
FIG. 2 is a schematic end view of a winding head in accordance with the invention.

In accordance with the invention, the winding 500 includes the three before-mentioned generally identical winding patterns 100, 200, and 300, which patterns are simultaneously produced. Also in accordance with the invention, the winding patterns 100, 200, and 300 are produced by a winding head 505 (schematically shown in FIG. 2) having first, second, and third needles 510, 520, and 530 with the first and third needles 510 and 530 each being angularly spaced from the second needle 520 by about 40° and with the first and third needles 510 and 530 being spaced from each other by about 280°. The needles 510, 520, and 530 respectively serve to supply the separate wires 501, 502, and 503 which are employed to simultaneously produce the three winding patterns 100, 200, and 200. Apart from the angular relationship of the needles, the details of the construction of the winding head are not a part of the disclosed invention and, accordingly, are not described.

The winding patterns 100, 200, and 300 are each provided by advancing the winding head 505 through the bore of a stator in one axial direction, by rotating the winding head 505 in one rotative direction, by retracting the head 505 through the stator bore in the opposite axial direction, and by rotating the head 505 in the opposite rotative direction to complete a cycle.

In the disclosed construction, the winding patterns 100, 200, and 300 each comprise twelve coils 101 through 112, 201 through 212, and 301 through 312, each coil is of equal span length and passes through a pair of angularly spaced stator slots having a span of 30°.

In the winding pattern 100, the needle 510 is first advanced with the wire 501 through the slot 1 and the wire 501 is then arcuately carried to the slot 4, retracted through the slot 4, and then arcuately returned to the slot 1, the wire 501 being wound into the coil 101 in the counterclockwise rotative direction, as shown in FIG. 1 with coil legs in the slots 1 and 4. When the desired number of turns have been completed after the wire 501 is retracted from the slot 4, the next coil 102 is wound by arcuately carrying the wire to the slot 7, by advancing the wire through the slot 7, then by arcuately carrying the wire back to the slot 4 and retracting the wire through the stator, thus completing one turn of the clockwise wound coil 102 which has coil legs in the slots 4 and 7. When the coil 102 has been completed with the desired number of turns, the wire 501, after being retracted through the slot 4, is arcuately carried to the slot 7, advanced through the slot 7, and is then arcuately carried to the slot 10 to begin the coil 103 which is wound in the counterclockwise direction with coil legs extending through the slots 7 and 10 in the same manner as the coil 101. Following completion of the coil 103, coil 104 is wound in the clockwise direction through the slots 10 and 13 and in the same manner as the coil 102. The winding operation is then repetitively completed in like manner to complete the winding of coils 105 through 112 in the first winding pattern 100.

The second and third winding patterns 200 and 300 are simultaneously wound with the winding of the first pattern 100. In this regard, the coil 201 of the winding pattern 200 is commended by advancing the needle 520 to carry the wire 502 through the slot 33 and by subsequently winding the coil 201 in the counterclockwise direction through the slots 33 and 36 in the same manner and at the same time as the coil 101 and by the same winding head movements which produce the coil 101. Following completion of the coil 201, the coil 202 is wound in the clockwise direction through the slots 36 and 3 in the same manner and at the same time as the winding of the coil 102 and by the same movements of the winding head 505. The winding operation is then repetitively completed to produce coils 202 through 212 in like manner to the winding of the winding pattern 100.

The third winding pattern 300 is produced simultaneously with the first and second patterns by operation of the third needle 530. In this regard, the coil 301 is commenced by advancing the needle 530 to carry the wire 503 through the slot 29 and to subsequently winding the coil 301 in a counterclockwise direction through the slots 29 and 32 in the same manner and at the same time as the winding of the coils 101 and 102 and by the same movements of the winding head 505. Following completion of the coil 301, the next coil 302 is wound in the clockwise direction through the slots 32 and 35 in the same manner and at the same time as the coils 102 and 202 and by the same movements of the winding head 505. The pattern 300 is repetitively completed by winding coils 303 through 312 in like manner to the winding of patterns 100 and 200. Various of the features of the invention are set forth in the following claims.

What is claimed is:

1. A method of winding of stator or the like comprising the steps of simultaneously winding in one rotative direction a first group of adjacently located first, second, and third coils of equal span with the legs of the second coil being located in spaced slots respectively immediately adjacent to the slots receiving the adjacent legs of the first and third coils, continuing said winding by simultaneously winding in the opposite rotative direction a second group of first, second, and third adjacently located coils of the same span as the coils of the first group and with the legs of the second coil of the second group being located in spaced slots immediately adjacent to the slots receiving the adjacent lets of the first and third coils of the second group and with one of the legs of each of the first, second, and third coils of the second group being respectively located in the same slot as the adjacent one of the legs of the first, second, and third coils of the first group.

2. A method in accordance with claim 1 wherein the span is 40°.

3. A method in accordance with claim 1 wherein the first, second, and third coils in each group are wound in series by first, second, and third wires.

4. A stator assembly including a stator having a plurality of slots, and a plurality of coils of equal span length including a first coil wound in one rotative direction with one leg in a first of said stator slots, a second coil angularly adjacent to and partially lapping said first coil and wound in the opposite rotative direction with one leg in a second of said stator slots located adjacent to said first stator slot, a third coil angularly adjacent to said second coil and wound in said one rotative direction with one leg in a third of said stator slots located adjacent to said second stator slot, said third coil partially lapping said first and second coils, and a fourth coil angularly adjacent to said third coil and wound in said opposite rotative direction with one leg in a fourth of said stator slots located adjacent to said third stator slot, said fourth coil partially lapping said second and third coils.

5. A stator assembly in accordance with claim 4 wherein said stator includes 36 slots and said span length is 40°.

6. A stator assembly in accordance with claim 4 wherein said first and fourth coils are series wound with the same wire.

7. A stator assembly in accordance with claim 4 wherein said fourth coil has another leg located in said first slot.

8. A stator assembly in accordance with claim 4 wherein said first and said fourth coils are series wound with a first wire and said fourth coil has another leg in said first slot, and further including a fifth coil angularly adjacent to said fourth coil and wound in said one rotative direction with one leg in a fifth of said stator slots located adjacent to said fourth stator slot and with another leg in said second slat, said fifth coil partially lapping said third and fourth coils and being series wound with said second coil with a second wire, and a sixth coil angularly adjacent to said fifth coil and wound in said opposite rotative direction with one leg in a sixth of said stator slots located adjacent to said fifth stator slot and with another leg in said third slot, said sixth coil partially lapping said fourth and fifth coils and being series wound with said third coil with a third wire.

9. A method of winding a dynamo electric machine member comprising the steps of simultaneously winding in one rotative direction a first group of adjacently located mutually nonlapping coils of equal span, continuing said winding by simultaneously winding in the opposite rotative direction a second group of adjacently located mutually nonlapping coils of the same number as the first group and with the same span as the coils of the first group and with the second coil group lapping the first coil group.

10. A stator assembly including a stator having a plurality of slots, and a plurality of coils of equal span length including a first coil wound in one rotative direction, a second coil angularly adjacent to and partially lapping said first coil and wound in the opposite rotative direction, and a third coil angularly adjacent to said second coil and wound in said one rotative direction, said third coil partially lapping said first and second coils.

11. A stator assembly including a stator having a plurality of slots, and a plurality of coils of equal span length located in said slots and including a first coil wound in one rotative direction, a second coil angularly adjacent to and partially lapping said first coil and wound in the opposite rotative direction, and a third coil angularly adjacent to said second coil and wound in said one rotative direction, said third coil partially lapping one of said first and second coils.

12. A stator assembly including a stator having a plurality of slots, and a plurality of coils of equal span length and of substantially the same number of turns located in said slots including a first coil wound in one rotative direction, and a second coil angularly adjacent to and partially lapping said first coil and wound in the opposite rotative direction.

13. A stator assembly comprising a stator including a plurality of angularly adjacent slots, and a winding including a plurality of coils each having a pair of angularly spaced legs and being of the same span length, said coils being wound in said slats such that each slot includes one leg of two oppositely wound coils, and such that said span length extends for an odd number of slots.

14. A method of winding a dynamo electric machine member having a series of angularly spaced slots, said method comprising the steps of simultaneously winding in various of the slots and in the same rotative direction a first group of adjacently located mutually nonlapping coils of equal span of less than about 50 degrees.

15. A method of winding a dynamo electric machine member having a series of angularly spaced slots, said method comprising the steps of winding in one rotative direction a first coil with a span of at least two slots, continuing said winding by immediately winding with the same wire in the opposite rotative direction a second adjacently located nonlapping coil with the same span as said first coil and with each of said first and second coils having a leg jointly occupying one of the slots, and further continuing said winding by immediately winding with the same wire and in said one rotative direction a third coil located in adjacent nonlapping relation to said second coil and with the same span as said first and second coils and with each of said second and third coils having a leg jointly occupying another one of the slots.

PO-1050
(5/69)

UNITED STATES PATENT OFFICE
CERTIFICATE OF CORRECTION

Patent No. 3,600,619          Dated August 17, 1971

Inventor(s) Roger C. Tiarks

It is certified that error appears in the above-identified patent and that said Letters Patent are hereby corrected as shown below:

| | |
|---|---|
| Column 1, line 15, "3,396,290" should read -- 3,432,707 --. | |
| Column 2, line 32 | "3,396,290" should be --- 3,432,707 --- |
| Column 2, line 34 | delete "some of"; |
| Column 3, line 37 | "202" should be --- 203 ---; |
| Column 3, line 68 | "lets" should be --- legs ---; |
| Column 4, line 33 | "slat" should be --- slot ---; |
| Column 5, line 2 | "slats" should be --- slots ---. |

Signed and sealed this 15th day of August 1972.

SEAL)
.ttest:

EDWARD M. FLETCHER, JR.          ROBERT GOTTSCHALK
.ttesting Officer          Commissioner of Patents

PO-1050
(5/69)

UNITED STATES PATENT OFFICE
CERTIFICATE OF CORRECTION

Patent No. 3,600,619            Dated August 17, 1971

Inventor(s) Roger C. Tiarks

It is certified that error appears in the above-identified patent and that said Letters Patent are hereby corrected as shown below:

Column 3, line 75        delete "$40°$", insert --- $30°$ ---;

Column 4, line 21        delete "$40°$", insert --- $30°$ ---.

Signed and sealed this 21st day of November 1972.

(SEAL)
Attest:

EDWARD M. FLETCHER, JR.
Attesting Officer

ROBERT GOTTSCHALK
Commissioner of Patents